United States Patent Office 3,711,319
Patented Jan. 16, 1973

3,711,319
COATING OF PARTICLES OR POWDERS
Tsutomu Irikura and Jun Imai, Tokyo, Japan, assignors to Kyorin Seiyaku Kabushiki Kaisha
Filed June 16, 1970, Ser. No. 46,731
Claims priority, application Japan, June 18, 1969, 44/48,037
Int. Cl. B05c 25/00; B44d 1/02
U.S. Cl. 117—100 A    6 Claims

ABSTRACT OF THE DISCLOSURE

A process for coating particles or powder, characterized in that a horizontally rotating disk is installed in the lower part of a round coating tower, and gas is guided in between the round tower and the rotating disk, and also, particles or powder to be coated are supplied into the upper part of the tower, and a coating agent is sprayed into the particles or powder flowing above the disks due to the upward passage of the gas and the centrifugal force of the disk.

The present invention relates to a process for coating particles or powder.

In recent years, a fluidized-bed coating (an air suspension coating) technique has been developed in place of the conventional pan coating process, which can be applied to the coating of particles of a small diameter, such as granules or crystal powder.

The coating process, utilizing a fluidized bed, has, over the years, been improved in many ways, but still has defects such that a group of particles is apt to cohere and stick to a surrounding wall, and, because of the large amount of air being used, particles of a small diameter are apt to be carried out with the air flow further, because the particles are furiously agitated in the layers, the particles as well as the piping and apparatus are abraded.

The present invention relates to a coating process, for eliminating the defects of the conventional fluidized-bed coating apparatus, and to obtain a uniform layer of fluid which is generated easily without being influenced by the distribution of grain size of the particles, and has such a large capacity as will enable a coating to be achieved with a small amount of a necessary air flow.

Accordingly, this invention provides a process for coating particles or powder in which a horizontally rotating disk is installed in the lower part of a coating tower having a circular horizontal cross-section, in which hot dry air is blown in below the disk and is guided upwardly between the coating tower and the periphery of the disk to above the disk, particles or powder to be coated are supplied into the tower above the disk, and coating materials are sprayed into a flowing fluidized bed of the particles or powder developed by the upward flow of air above the disk and the centrifugal force of the disk.

Further, the particles or powder carried by the hot air are dried and fall downwardly toward the disk and are carried, due to centrifugal force, toward the wall of the tower on the rotating disk to repeat the above movement, and coating materials are sprayed downwardly within the tower from above the disk on the rotating and upwardly and downwardly flowing particles.

Figure 1:
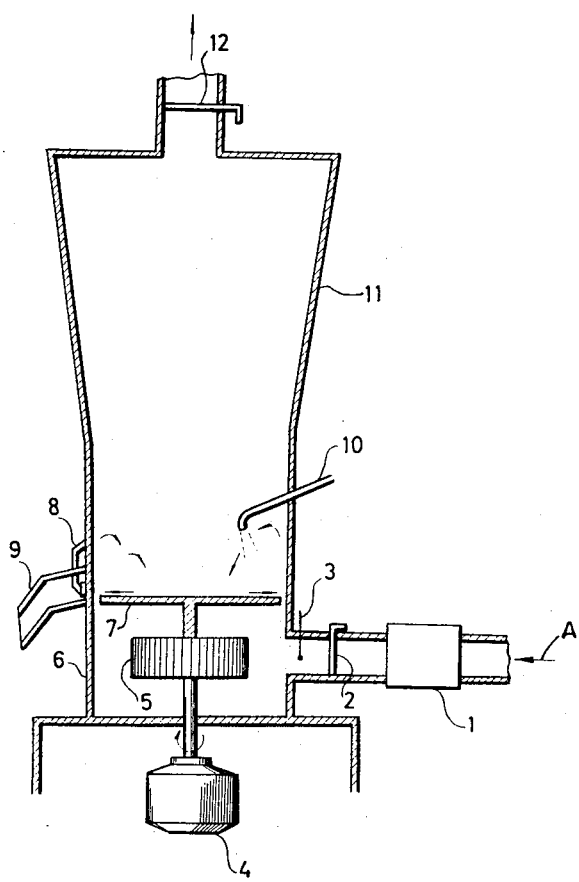
Figure 2:

Now, the structure and the method of operation of the present invention will be explained referring to the attached drawings in which; FIG. 1 shows a sectional drawing, illustrating an example of a coating apparatus, employed in one embodiment of the present invention, and FIG. 2 shows another example of the rotating disk, shown in FIG. 1.

FIG. 1 shows a vertically extending round coating tower with a rotating disk 7 at the lower part. The space between the inner wall of the round tower and the disk is 0.5–5 mm., and hot air is passed through the space from the lower part. The above disk 7 can be made, as a flat even plate, as shown in FIG. 1, or in the form of a disk, curved like a saucer, as shown in FIG. 2, for enlarging the distance of tumbling-about of the particles to be coated. The disk 7 is made to be exchangeable. The disk 7 is rotated by means of a variable motor 4, so that the speed of rotation is adjustable. Air is fed in the direction of arrow A by a fan (not shown in the drawing) and is heated by means of a heater 1. It is adjusted by a damper 2 to the amount, suitable for the fineness of the powder, and then goes up through the space between the circumference of the round tower and the periphery of the disk 7. The temperature of the hot air is measured by an electronic thermometer 3, which is connected with a switch of the heater to control temperature within the preset limits. A fan 5 is used for blowing air uniformly onto the disk, and is directly connected with the shaft of the motor 4. When there is fear that the particles to be coated may be decomposed or deteriorated by air, it is desirable to use an inert gas, for example, a nitrogen gas, or a carbonic acid gas instead of a hot air gas.

The particles to be coated, such as a medical compound of a foodstuff are introduced in the top of the coating tower and are rotated and made to flow by the disk and the hot air flow.

A spraying device 10 directs coating materials into the tower above the disk 7. For spraying at high pressure through a nozzle, a method of spraying two kinds of fluid through a nozzle or a method of spraying by a rotating disk may be employed. The drawing shows a spraying device, utilizing the method of spraying two kinds of fluid. An ordinary high polymerized coating agent is dissolved at a percentage of 5 to 20 in a solvent to be sprayed. A high polymerized substance may be dispersed in water is for example, gelatine, gum arabic, starch, poly-vinyl-alcohol, poly-vinyl-pyrrolidone, carboxymethyl-cellulose, methyl-cellulose, ethylcellulose, an alkyl-hydroxyl-derivative of cellulose or polyethylene-glycol.

Polyvinyl - pyrrolidone, methyl - cellulose, an alkyl-hydroxy-derivative of cellulose, cellulose acetate phthalate, a copolymer of styrene and maleic acid, a copolymer of methyl-acrylic acid and acrylate, wax, for example, carnauba wax, montan wax or micro-crystalline wax, higher fatty acids, for example, oleic acid or stearic acid; higher alcohol, for example, stearyl alcohol, or oleyl alcohol, non-ionic surface activating agents are dispersed in an organic solvent to be used as an ordinary coating agent. Corresponding to the object of the product, other ingredients of powder may be, together with these coating agents, dissolved or suspended to be sprayed.

The side face of the wall of tower 6 is constructed so that the coated powder is removed from the tower by a chute 9 through a damper 8 located on the side wall of the round tower facing the periphery of the disk 7.

The upper part 11 of the round coating tower 6 forms conical tower, divergent slightly upwards, and is connected through a damper 12 with a cyclone for the exhaustion of air.

The apparatus of the present invention, is able to decrease the amount of air as compared with the ordinary fluidized bed coating process, and thus, the coating tower can be made shorter and can easily produce a uniform fluidized bed. Accordingly, the particles of powder are almost not abraded, so that uniform coating can be obtained. The particles to be coated are not limited to granules, granulated in a spherical shape. The apparatus can be most excellently applied to coating irregularly pillared pellets or crystal powder.

Next, we will explain examples of coating, which employ the present invention. The present invention is not, of course, limited by the examples.

EXAMPLE 1

The coating round tower is a tower, 200 mm. in length and 230 mm. in diameter made of stainless steel. The horizontally rotating disk is a disk, 228 mm. in diameter and 5 mm. in thickness and made of stainless steel. The number of rotations of the disk is adjusted to about 150 r.p.m. by a variable motor. Initially, the hot air apparatus is set in operation and the temperature of the hot air is elevated to about 70° C. Hot air is fed from the lower part of the tower and warms the rotating disk coating. When it reaches about 50–60° C., about 500 g. of crystalline ascorbic acid (230–100μ) are introduced into the tower as nucleating particles on the rotating disk. The crystalline ascorbic acid is carried up by the hot air, from the periphery of the disk, passes upwardly for a certain height and then falls downwardly to the central part of the disk. When the particles reach the rotating disk, they are carried toward the peripheral part by the centrifugal power of rotation. At the peripheral part, they are again blown upwardly to the upper part by the hot air. The amount of air is adjusted so as to blow the particles upwardly to a height of about 15–20 cm. The crystalline particles repeat each movement of rising, falling, rotation and tumbling. Owing to the added rotational movement, the particles can be made to flow uniformly with a small amount of air, as compared with the ordinary fluidized bed coating. After the particles tumble and flow for several seconds, they are made warm, and a coating solution is sprayed into the fluidized bed from a spraying nozzle. The coating solution is a ethanol solution of 10% polyvinyl-pyrrolidone (PVP) and is heated at about 50° C. and sprayed by a long-necked spray gun with a nozzle, employing two kinds of fluid, one of which is a compressed air. The diameter of the nozzle is 1.0 mm., and a circular spray pattern is produced. About 300 g. of the solution is continuously sprayed in about 10 minutes. The amount to be sprayed is adjusted by a liquid volume adjuster of the spray gun. It is suitable that the air is compressed 1 kg./cm.² When the spraying of the coating solution is finished, the operation is continued for several minutes to achieve a perfect dryness. After the coated particles are dried, they are taken out of the tower 6 through the chute 9. Thus, crystalline ascorbic acid is obtained which is uniformly coated with PVP.

EXAMPLE 2

The coating tower and the rotating disk are same as used in Example 1. The number of rotations of the disk is adjusted to about 200 r.p.m. by means of a variable motor. The hot air apparatus is set at about 60° C. The round tower and the disk are preheated. As the hot air being softly passed on the rotating disk, there is thrown in with about 500 g. of the crystal ascorbic acid, coated with PVP, as obtained in Example 1. The amount of the hot air is adjusted so as to make the coated crystalline ascorbic acid flow in a layer at a height of about 15–20 cm. The crystalline ascorbic acid, already coated with PVP, is, further, coated with a vitamin compound. 40 g of cyanin nitrate, passed through a 220-mesh screen, and 2 g. of riboflavin fine powder, passed through a 270-mesh screen are suspended in 300 g. of an ethanol solution of 10% PVP. The thus obtained solution is used as a coating solution. The coating solution is heated to about 40° C., and sprayed at an angle of about 90° to the flowing layer from a spray nozzle, employing two kinds of fluid, one of which is a compressed air. The spraying feed rate is 300 g./10 minutes. When the coating is finished, the hot air is continued to pass for several minutes. After being dried, the particles are removed. A coated particle, according to Examples 1 and 2, having a great stability, can be obtained by coating cyanin nitrate and riboflavin after producing the PVP coating for protection on the surface of the crystalline ascorbic acid.

EXAMPLE 3

Using the same apparatus as employed in Example 1, 500 g. of irregularly pillared granules (30–12 mesh), granulated by means of a pelletizer are tumbled and made to flow. Acetone-ethanol (1:1) of 7% cellulose acetic phthalate is added as a plasticizer with a small amount of diethyl-phthalate. 300 g. of the thus-obtained solution is sprayed by a spray gun, employing two kinds of fluid. The spray is completed at a feedrate velocity of 300 g./10 minutes. The coated granule, thus obtained, is stable for 3 hours at the examination of an artificial gastric juice, but is disintegrated in about 5 minutes at the examination of an artificial intestinal juice. A stable granule, soluble in an intestinal juice, can be obtained.

The above-mentioned process is comparatively simple and the apparatus is quite effective. Thus, coating of particles can be performed without the necessity of a qualified or skilled staff and the operating time is shortened since no mechanical power device, which has to be treated with care is used, there is practically no abrasion, even in the case of soft nucleating particles.

What is claimed:

1. A process for coating particles and powder comprising the steps of forming a vertically extending round tower, positioning a horizontally arranged disk surface within the tower intermediate its upper and upper ends and spacing the circumferential peripheral edge of the disk surface closely inwardly from the inner surface of the tower for forming a narrow annular space therebetween, introducing gas into the lower end of the tower below the horizontally arranged disk surface for flowing the gas upwardly between the circumferential peripheral edge of the horizontally arranged disk surface and the inner surface of the tower, introducing the particles to be coated into the upper end of the tower for downward passage toward the horizontally arranged disk surface, rotating the horizontally arranged disk surface for effecting a rotating flow of the particles and, in combination with the upwardly directed flow of the gases at the circumferential peripheral edge of the horizontally arranged disk surface, affording an upwardly directed flow to the particles at the inner surface of the tower and a downwardly directed flow of the particles centrally within the tower, and spraying a coating solution downwardly into the rotating and upwardly- and downwardly-flowing particles to be coated.

2. A process, as set forth in claim 1, characterized therein by shaping the upwardly facing horizontally arranged disk surface like a saucer for increasing its surface area facing upwardly within the round tower.

3. A process, as set forth in claim 1, characterized therein by heating the gas as it is introduced into the round tower below the horizontally arranged disk surface and checking the temperature of the heated gas for maintaining it at the proper level.

4. A process, as set forth in claim 1, wherein the particles being coated are a medical compound of a foodstuff.

5. A process, as set forth in claim 1, characterized therein by using a highly polymerized surbstance as the coating substance and dissolving the substance in a ratio of 5 parts of the substance to 20 parts of one of water and an organic solvent.

6. A process, as set forth in claim 1, characterized therein by removing the coated particles from the round tower through an opening located approximately at the plane of the horizontally arranged disk surface.

References Cited

UNITED STATES PATENTS

| | | | |
|---|---|---|---|
| 2,945,634 | 7/1960 | Beck et al. | 117—100 X |
| 3,099,493 | 7/1963 | De Hart et al. | 117—100 X |
| 3,106,492 | 10/1963 | MacDonald | 117—100 X |
| 3,202,731 | 8/1965 | Grevenstuk et al. | 117—100 X |
| 3,503,790 | 3/1970 | Gringras | 117—100 |

WILLIAM D. MARTIN, Primary Examiner

M. R. P. PERRONE, Jr., Assistant Examiner

U.S. Cl. X.R.

117—100 B, 100C, 100 S, 105.3, DIG 6; 118—25